Patented Feb. 26, 1935

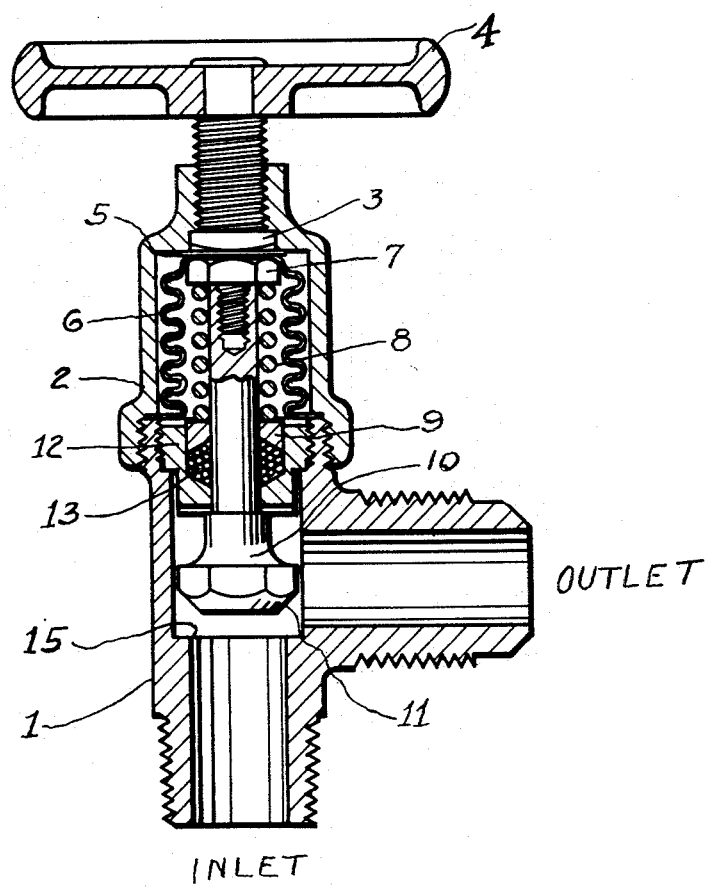

1,992,902

UNITED STATES PATENT OFFICE 1,992,902

VALVE

Robert D. McIntosh, Chicago, Ill., assignor to The Imperial Brass Manufacturing Company, Chicago, Ill., a corporation of Illinois Application February 1, 1934, Serial No. 709,370

2 Claims. (Cl. 251—31)

My invention is concerned with valves, intended primarily for use in mechanical refrigeration, but which can be used elsewhere, which shall be of an extremely simple construction, and yet capable of controlling high pressure light fluids, and in which the sealing element can be readily and easily replaced without shutting off the fluid and removing the valve from the line. To this end it consists of the novel combination hereinafter fully described, and particularly defined in the claims.

To illustrate my invention, I annex hereto a sheet of drawings in which the figure is a vertical section through my valve.

In carrying out my invention in its preferred form, the main portion of the valve casing 1 is in the form of a T having the inlet and the outlet apertures separated by the valve seat 15 with which the beveled end 11 of the valve 10 cooperates. The upper end of this T shaped casing is threaded both interiorly and exteriorly, and cooperating with the outer threads is the top piece 2 screwed thereon which is in the shape of an inverted cup with a threaded aperture in the top with which cooperates the threaded stem of the hand wheel 4, the inner end of which is provided with the rounded tip 3 which cooperates with the metallic disk 5 preferably secured on the top of the diaphragm 6, which preferably takes the form of a corrugated thin metallic cylinder which is readily expansible and contractible due to presence of the corrugations. The upper end of the cylinder is closed as shown, the cylinder likewise being in the form of an inverted cup, and the lower end of the cylinder, extending outwardly to form an annular flange, is caught and held airtight between the top of the casing 1 and the internal annular flange in the cooperating portion of the casing 2 when the top 2 is screwed in place. The stem of the valve 10 is guided at its lower end by passing through the body 12 of the stuffing box screwed into the upper end of the casing 1. This stuffing box contains the packing 13, which is held in place and kept properly tight by the annulus 9 fitted in the top thereof and closing the upper end of the stuffing box or packing gland. The upper end of the valve stem has threaded into it the bolt 7, the top of which cooperates with the bottom of the inverted cup shaped cylinder 6, and the flange formed by the projecting head cooperates with the helically-coiled spring 8 which surrounds the valve stem and is interposed between the head of the bolt 7 and the ring 9, so that said ring 9 is under constant pressure keeping the packing 13 under proper tension so that it acts at all times most efficiently.

The operation of the complete device will now be readily apparent. When it is desired to close the valve, the hand wheel 4 is turned to screw it down and the valve is forced to its seat 15. When the valve is to be opened, the hand wheel is unscrewed and the spring 8 lifts the valve off of its seat, the corrugations of the diaphragm 6 serving to permit its contraction and elongation without interfering at all with the operation of the device.

When the diaphragm 6 becomes worn, or possibly punctured, it can be replaced without the necessity of shutting off the valve by simply unscrewing the upper portion 2 of the casing, and when this is done, the spring 8 serves to keep the packing ring 9 securely in place so that no gas can escape through the packing although the primary seal formed by the diaphragm 6 is temporarily removed. All that is necessary is to replace the worn out or punctured diaphragm 6 with a new one and screw the top piece 2 with its associated hand wheel back in place. It will, of course, be understood that if the diaphragm 6 should become punctured during the operation of the valve, the packing 13 will prevent the escape of any gas from the valve casing.

I am aware that prior to my invention a somewhat similar structure, shown in the Forbes Patent No. 1,890,505, dated December 13, 1932, had been proposed, in which no packed bearing was employed and a back seating valve was relied on to prevent leakage while the diaphragm was being changed. However, if the diaphragm in this Forbes device was ruptured while the valve was only partly opened, as it might very well be, a leakage is bound to occur, which is impossible with my improved construction. Furthermore, if the Forbes valve were left partly open in a line with a compressor, as in refrigerating machinery, the pulsations of the compressor would be transmitted to the diaphragm and the continued vibration thereof would crystallize and weaken the metal, causing its early rupture, and this would be extremely objectionable, especially with the sylphon type of diaphragm preferably employed by me, due to the corrugations therein. In my construction, no pulsations can be transmitted to the diaphragm.

While I have shown and described my invention as embodied in the form which I at present consider best adapted to carry out these purposes, it will be understood that it is capable of modification, and that I do not desire to be limited in the interpretation of the following claims except as may be necessitated by the state of the prior art.

What I claim is new, and desire to cover by Letters Patent of the United States is:

1. In a valve, the combination with a two-part valve casing, the lower part having inlet and outlet passages and a valve seat between them, and the upper part detachably secured on the top of the lower part and having an aperture through the top, of an operating member movable through said aperture to open and close the valve to any desired extent, an imperforate sealing diaphragm engaged on its upper surface by the operating member, a valve stem with its upper end engaging the under side of the sealing member, a packed bearing in the top of the lower part of the casing through which the valve stem slides, a valve on said stem co-operating with the seat, a bearing member slidable in the top of the bearing and engaging the packing, and a helically-coiled expanding spring surrounding the valve stem and having its upper end co-operating with the top of the valve stem and its lower end engaging the bearing member to increase the pressure on the packing as the valve is moved toward its closed position, thereby sealing the interior of the lower part from the upper in all positions of the valve and protecting the diaphragm from possible vibration and preventing possible leakage in case the diaphragm should be ruptured.

2. In a valve, the combination with a two-part valve casing, the lower part having inlet and outlet passages and a valve seat between them, and the upper part detachably secured on the top of the lower part and having an aperture through the top, of an operating member movable through said aperture to open and close the valve to any desired extent, an imperforate sealing diaphragm engaged on its upper surface by the operating member and consisting of a corrugated metal cylinder sealed at its top and with its bottom secured between the top of the bottom part and the bottom of the top part of the casing, a valve stem with its upper end engaging the underside of the sealing member, a packed bearing in the top of the lower part of the casing through which the valve stem slides, a valve on said stem co-operating with the seat, a bearing member slidable in the top of the bearing and engaging the packing, and a helically-coiled expanding spring surrounding the valve stem and having its upper end cooperating with the top of the valve stem and its lower end engaging the bearing member to increase the pressure on the packing as the valve is moved toward its closed position, thereby sealing the interior of the lower part from the upper in all positions of the valve and preventing possible leakage in case the diaphragm should be ruptured.

ROBERT D. McINTOSH.